United States Patent [19]
Shaffer

[11] 3,748,391
[45] July 24, 1973

[54] TELEPHONE RING-TRIP CIRCUIT

[75] Inventor: William E. Shaffer, Rochester, N.Y.

[73] Assignee: Stromberg-Carlson Corporation, Rochester, N.Y.

[22] Filed: Dec. 30, 1971

[21] Appl. No.: 214,502

[52] U.S. Cl............ 179/84 R, 179/18 HB, 307/88 R
[51] Int. Cl......................... H04q 9/00, H03k 17/00
[58] Field of Search....................... 179/84 R, 18 HB, 179/84 T, 45, 18 J; 323/48, 49, 45; 336/155, 212; 307/202, 88 R

[56] References Cited

UNITED STATES PATENTS

| | | | |
|---|---|---|---|
| 3,247,326 | 4/1966 | Clark | 179/18 HB |
| 2,039,044 | 4/1936 | Wolfert et al. | 323/45 |
| 3,512,014 | 5/1970 | Brumby et al. | 307/318 |
| 3,373,291 | 3/1968 | Peterson et al. | 307/202 |
| 3,339,114 | 8/1967 | Kelley et al. | 307/202 |
| 2,998,531 | 8/1961 | Kiyasu | 307/88 R |

*Primary Examiner*—Kathleen H. Claffy
*Assistant Examiner*—Alan Faber
*Attorney*—Charles C. Krawczyk

[57] ABSTRACT

Ringing signals are applied to a telephone line through a winding of a saturable reactor which is maintained in a saturated magnetic state until driven out of saturation by a DC current which flows through the telephone line upon completion of a DC current path via the telephone when the handset is lifted from its cradle. At that time, an AC signal is induced in another winding of the reactor which is used for enabling the ringing generator to be disconnected from the telephone line and the connection between the calling and called parties to be completed.

12 Claims, 3 Drawing Figures

TELEPHONE RING-TRIP CIRCUIT

BACKGROUND OF THE INVENTION

This invention relates to telephone ring-trip circuits for providing a signal to interrupt a ringing signal upon detection that a telephone call has been answered.

Ringing signals are used in telephone systems to apprise a telephone subscriber of the presence of an incoming call on his telephone line. A ringing signal consists of periodic ringing burst of AC current having a frequency, for example, of 20 cycles per second with a duration of perhaps 1 second separated by intervals of no current having a duration of perhaps three seconds. When the ringing signal is applied to an audible device in the signalling circuit of a telephone set, each AC ringing burst causes the device to produce an audible sound while each separating interval results in a silent period. The RMS value of the voltage of the AC bursts at the generator terminals is approximately 120 volts which is high enough to produce at least discomfort and possible harm to a called subscriber if he places the telephone receiver to his ear while the ringing signal is applied to the telephone line. It is therefore important that the ringing signal be interrupted as quickly as possible once a call is answered to avoid applying the ringing signal to the telephone receiver of the called subscriber.

The interruption of the ringing signal is performed by a ring-trip circuit located in the telephone ringing circuit which detects when a call is answered and thereupon causes the ringing generator, which generates the AC ringing current, to be disconnected from the telephone line. The ringing signal is applied to the telephone line through the ring-trip circuit and an office battery connected in series with the ringing generator. Until a call is answered and the telephone set communication apparatus is placed across the telephone line by lifting of the handset from its cradle, no path exists for the flow of DC current. DC current is blocked in the telephone signalling circuit by such as a capacitor or a zener diode. The lifting of the telephone handset by the called subscriber places a DC load across the telephone line, permitting the flow of DC current which upon detection initiates a signal to interrupt the ringing signal.

In some cases the ringing signal is interrupted prematurely before a telephone call is answered which breaks the connection and leads to telephone customer dissatisfaction since this inconveniences both the calling and called parties and also leads to operating inefficiency since telephone switching equipment must be used once again to establish the same connection after the telephone number is dialed again. Most present day telephone ring-trip circuits use a ring-trip relay which can be prematurely tripped by an unusually large ringing current and/or a ringing current which is rectified by rectifying components used in various modern telephone signalling schemes. A typical scheme is the key telephone arrangement wherein a number of neon lamps and ringers in different telephone sets respond simultaneously to the ringing signal on a single telephone line which places a heavy load on the ringing generator. The premature ring-trip problem and its solution in conjunction with the ring-trip relay are fully discussed in a copending application, filed on Oct. 26, 1971, for William E. Shaffer, entitled "Telephone Ring-Trip Circuit", Ser. No. 192,020.

The problems involved in designing a reliable ring-trip circuit can be appreciated only if one remembers that the ring-trip circuit must function properly for a wide variety of telephone circuit conditions which are materially changed for each ring-trip operation by the length of the telephone line to be rung as well as the type and number of telephone signalling devices to be operated simultaneously from the telephone line to which the ringing signal is applied. And since the lengths of different telephone lines vary greatly and the combination of signalling devices and signalling schemes are numerous, the design of a ring-trip circuit must incorporate a good deal of flexibility so as to function properly under all the different conditions to be encountered.

With the foregoing in mind, it is an object of the present invention to provide a new and improved ring-trip circuit for detecting when a telephone call is answered.

It is a further object of the invention to provide a new and improved ring-trip circuit designed with great flexibility for functioning properly under a wide variety of conditions without the liklihood of premature ring-trip operation.

It is a still further object of the invention to provide a new and improved ring-trip circuit which is not susceptible to premature ring-trip operation as a result of rectification of the ringing current.

BRIEF DESCRIPTION OF THE INVENTION

In accordance with a first embodiment of the invention, ringing signals are applied to a telephone line through a monitor winding of a saturable reactor which is maintained in a saturated magnetic state by a bias winding until driven out of saturation by a DC current. This DC current flows through the telephone line and the monitor winding upon the completion of a DC current path via the called telephone when the handset is lifted from its cradle, thereby providing an indication that the call has been answered. At that time, a continuously applied AC signal to an input winding of the reactor induces an AC signal in an output winding of the reactor which is applied to a control circuit for enabling the ringing generator to be disconnected from the telephone line and the connection between the calling and called parties to be completed.

A second embodiment of the invention employs two saturable reactors with two sets of windings, the arrangement being such as to cancel out the effect of induced voltages in some of the windings from the AC ringing signal through the monitor windings.

DESCRIPTION OF THE PREFERRED EMBODIMENT

Figure 1:
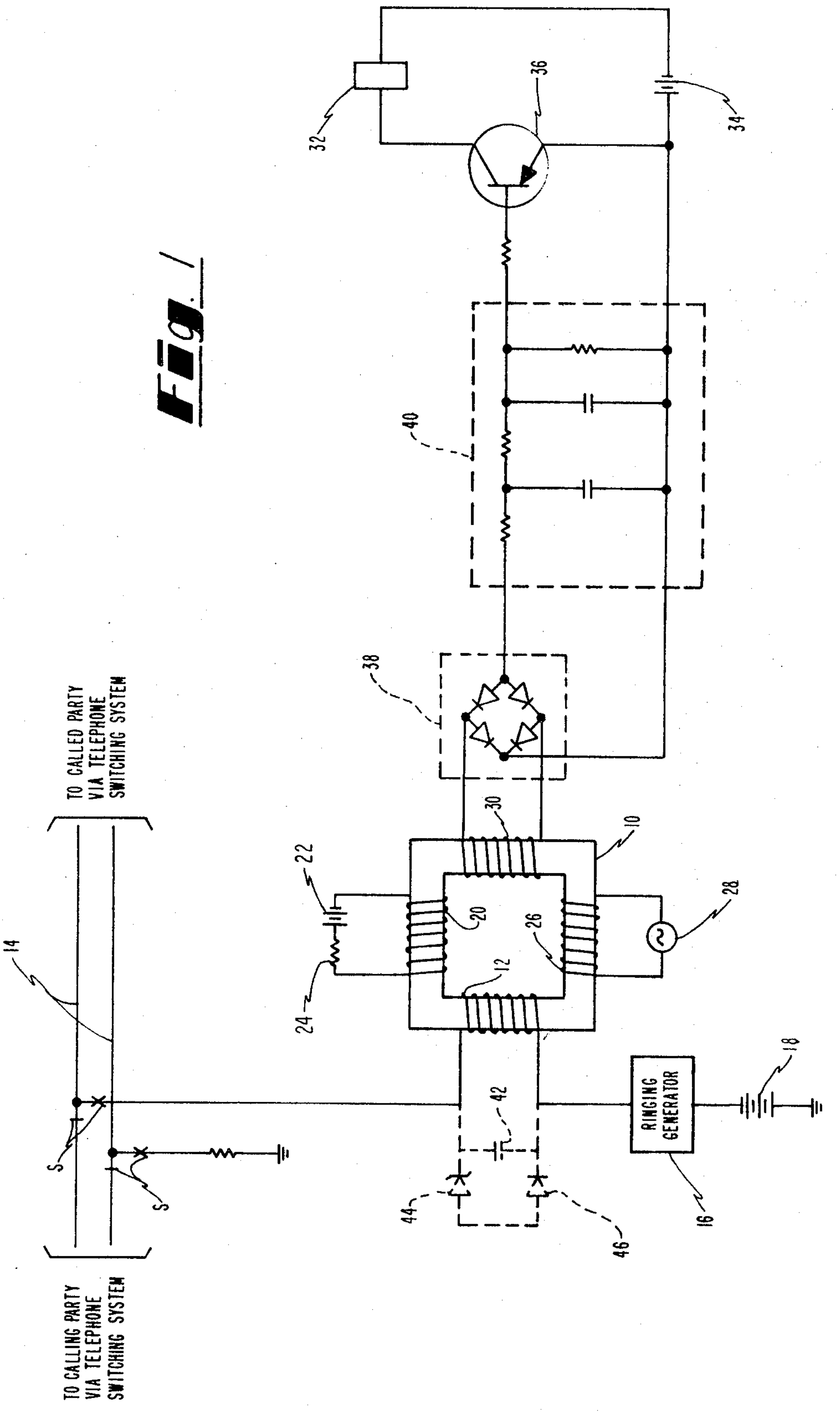
FIG. 1 illustrates a first embodiment of the invention wherein the ring-trip circuit employs a single saturable reactor.

As shown in FIG. 1, the ring-trip circuit of the invention employs a saturable reactor 10 which has wound around it four separate windings. A first winding 12, which may be referred to as the monitor winding, is connected between the telephone line 14 which is to be rung and a ringing generator 16 for applying thereto the ringing signal through an office battery 18 which supplies the DC current for detecting when the telephone call is answered. The ringing signal and DC current may be applied to the telephone line 14 through a pair of normally open S contacts (operated closed during signalling) while the calling and called telephone parties are isolated from each other via normally closed S contacts (operated open during signalling). This arrangement is fully detailed in a copending application, filed on Dec. 22, 1970, for Otto Altenburger, entitled "Ringing Control Circuit", Ser. No. 100,647, now U.S. Pat. No. 3,671,678.

A second winding 20 of reactor 10, hereinafter called the bias winding, is connected to a DC power source 22 through a current limiting resistor 24. The number of turns for bias winding 20 and the DC current therethrough produce a sufficient magnetomotive force to drive the reactor 10 into saturation represented by bias point X on a typical hysteresis curve shown in FIG. 2. The reactor 10 is driven far enough into saturation at point X that for most anticipated system conditions the AC ringing current through monitor winding 12 will not be capable of driving the reactor 10 out of saturation, the net magnetomotive force H oscillating about point X between points Y and Y′ on the hysteresis curve.

A third winding 26, called the input winding, is continuously energized from an AC generator 28. The AC voltage across the input winding 26 is used for inducing an AC voltage in the fourth winding 30 hereinafter referred to as the output winding. Very little, if any, voltage is induced in output winding 30 while the reactor 10 is in a saturated magnetic state. Thus, until the reactor 10 is driven out of saturation, no appreciable output signal appears across the terminals of the output winding 30.

The reactor 10 is driven out of saturation by a DC current which flows through the monitor winding 12 from the office battery 18 along the telephone line 14 via a DC current path which is completed through the closed hookswitch of the connected telephone (not shown) at the called station when the telephone handset is lifted from its cradle. This DC current produces a magnetic field in the reactor 10 which is opposed to the magnetic field produced by bias winding 20 and which is of sufficient strength to mullify the latter. The net magnetic flux produced is small enough so that the reactor is no longer in a saturated state, but operates in the region between the two flat portions of the hysteresis curve of FIG. 2. At this time, an AC voltage is induced in the output winding 30 from the AC voltage across the input winding 26, thereby providing an indication that the telephone call has been answered.

The output signal of output winding 30 can be used with any suitable control circuit for de-energizing the S relay (not shown) to return the S contacts to their normal states, thus, disconnecting the ringing generator 16 from the telephone line 14 and completing the connection between the calling and called parties. For instance, the control circuit shown in FIG. 1 utilizes an arrangement whereby a relay 32 connected in series with a battery 34 and the collector-emitter path of a transistor 36 is energized whenever the transistor 36 is rendered sufficiently conductive by the application of the output signal of output winding 30 across its base and emitter via a full-wave rectifying bridge 38 and a time delay circuit 40. The time delay circuit 40 is designed to avoid premature ring-trip operation by ensuring that the transistor 36 is not enabled by transient voltages which may be induced in output winding 30 as a result of some unusually large AC ringing current which causes the reactor 10 to be intermittently driven into and out of saturation. Such a situation can arise, for instance, in a key telephone arrangement wherein an excessive number of ringers and neon lamps are operated in parallel, thus, placing an inordinately heavy load on the ringing generator 16.

To further safeguard against premature ring-trip and provide additional design flexibility, the ringing current through monitor winding 12 can be limited by placing across its terminals any suitable device, such as a capacitor 42 or a diode 44 connected in series with a zener diode 46 shown as optional features in FIG. 1 via dashed line connections. Since the premature ring-trip problem can arise only when the reactor 10 is driven out of saturation by the AC ringing current during the half cycle that the current produces a magnetic field opposed to that of the bias winding 20, the diode 44 and zener diode 46 are poled for conduction during that half cycle.

Figure 2:
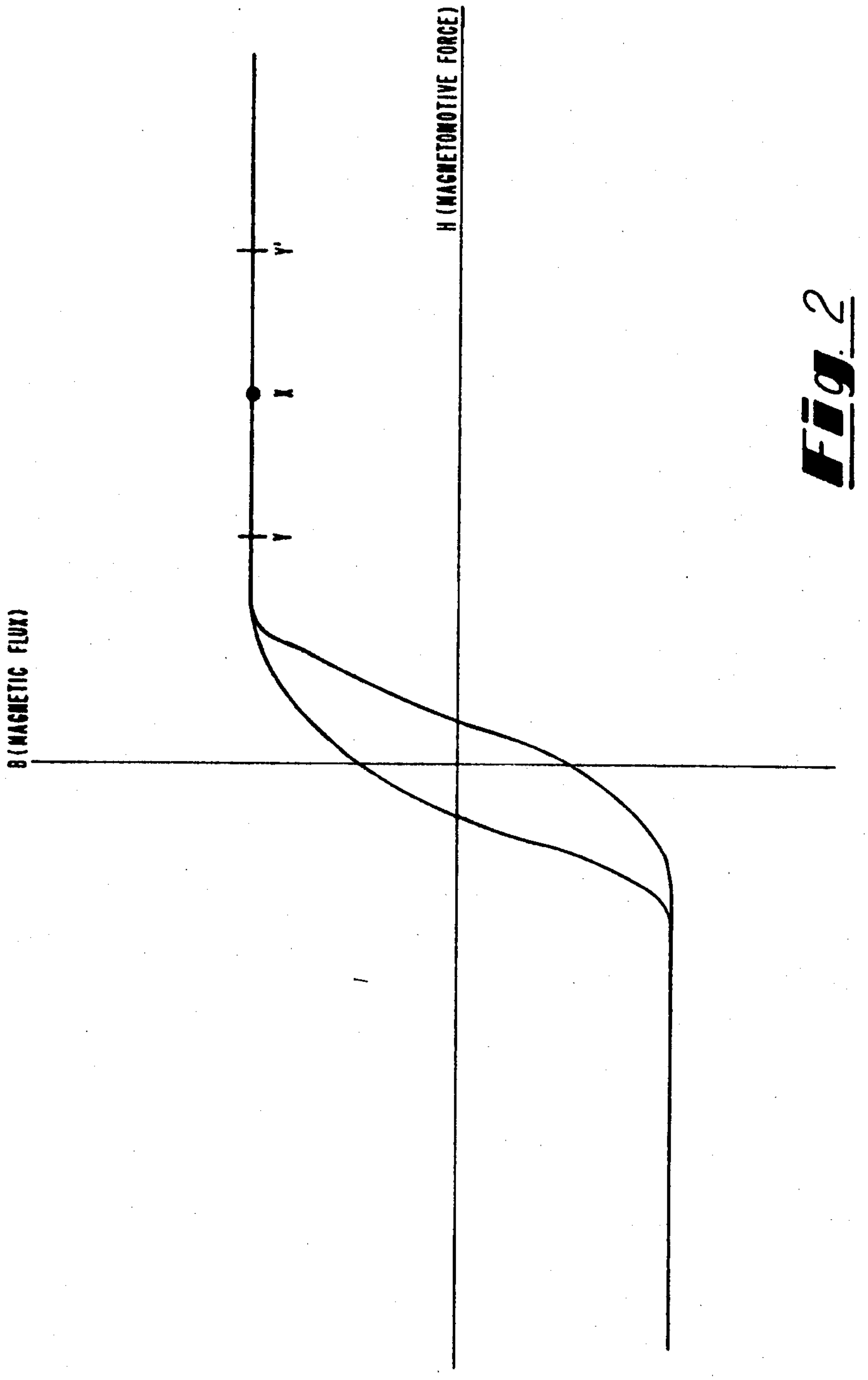
FIG. 2 shows a hysteresis curve and the operating points for the saturable reactor.

In reality, the two flat portions of the hysteresis curve of FIG. 2 which represent saturation regions are not exactly flat, as shown, but sloped so that while operating in these regions, slight voltages can be induced in the input and output windings by the flow of ringing current through the monitor winding 12. The magnitudes of these induced voltages relative to the normal design voltages are small so that any voltage induced in the output winding 30 would not be sufficient to cause relay 32 to operate. These voltages may be undesirable for other reasons, however, such as where portions of the ring-trip equipment are used simultaneously for performing other functions which require greater sensitivity. These undesirable induced voltages are eliminated by a second embodiment of the invention which employs two saturable reactors and two sets of windings.

Figure 3:
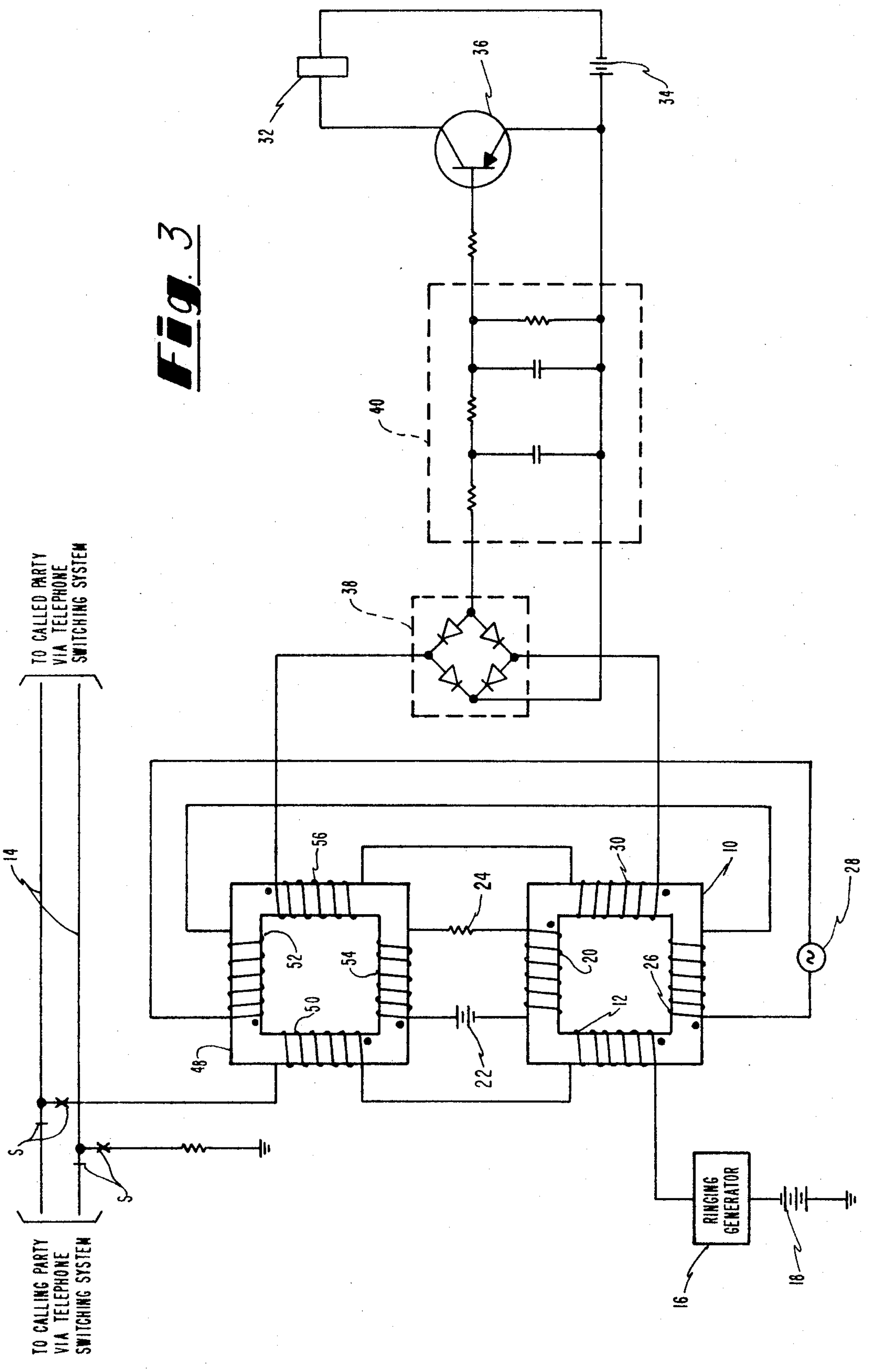
FIG. 3 illustrates a second embodiment of the invention wherein the ring-trip circuit employs two saturable reactors.

As shown in FIG. 3, a second saturable reactor 48 has wound around it four separate windings which are connected in series with their counterpart windings wound around the first saturable reactor 10 (the same reference numbers are used in FIGS. 1 and 3 for identical components). Thus, monitor winding 50, input winding 52 and bias winding 54 of reactor 48 are connected in series, respectively, with monitor winding 12, input winding 26 and bias winding 20 of reactor 10. The output signal is taken across the series combination of output winding 56 of reactor 48 and output winding 30 of reactor 10.

To facilitate the reader's understanding of how this circuit functions, the conventional system of dots is shown in FIG. 3. In accordance with this system, when a varying current enters one of the reactor windings at its dot marked terminal, the polarity of the voltage induced in one of the other reactor windings is positive if the induced voltage is measured from its dot marked terminal to its unmarked terminal. Applying this system and observing how the counterpart windings of reactors 10 and 48 are connected to each other with respect to their dot marked terminals, it is seen that current flowing through monitor windings 12 and 50 induces voltages in the output windings 30 and 56, respectively, and in the input windings 26 and 52, respectively, which oppose one another in their respective series circuits. Thus, voltages induced in these reactor windings from the flow of ringing current through the monitor windings are cancelled out. Other than this, the ring-trip circuit of FIG. 3 operates exactly the same as that of FIG. 1.

The ring-trip circuit of the invention provides three major advantages over other schemes which utilize a ring-trip relay. First, the impedance of the circuit through which the ringing signal is applied to the telephone line is low (because of the saturated magnetic state of the reactor during signalling) so that the ringing current is not materially affected thereby. This prevents attenuation of the ringing current below a minimum level required for operating the signalling device(s) in a called telephone, a particularly important consideration in conjunction with long telephone lines. Second, because of the nature of the circuit, rectification of the ringing signal caused by various rectifying components used in the signalling devices of many modern telephone sets does not create a premature ring-trip problem. Third, the combination of the time delay provided in the control circuit and the optional features for limiting the ringing current through the monitor winding of the reactor provides great flexibility for designing the ring-trip circuit of the invention to perform properly under a variety of different operating conditions which is an important design consideration. Thus, the invention provides a new and improved ring-trip circuit for detecting when a telephone call is answered.

What is claimed is:

1. A ring-trip circuit for detecting when a telephone handset is lifted from its cradle in response to a ringing signal applied to the telephone through the connected telephone line from a ringing generator connected in series with an office battery, comprising:

a saturable reactor;

an input winding of said reactor for receiving a continuous AC signal;

a bias winding of said reactor for receiving a DC current for driving said reactor into a saturated magnetic state;

a monitor winding of said reactor;

circuit means for connecting said monitor winding between the telephone line and the ringing generator so that the ringing signal passes therethrough, the arrangement being such that a DC current through said monitor winding from the office battery upon the completion of a DC current path via the telephone when the handset is lifted produces a magnetic field which drives said reactor out of saturation, and an output winding of said reactor for providing an output AC signal induced therein whenever said saturable reactor is driven out of saturation.

2. The ring-trip circuit of claim 1 including means connected across said monitor winding for limiting the magnitude of AC ringing current therethrough.

3. The ring-trip circuit of claim 1 including a control circuit connected across said output winding responsive to said output signal for actuating said circuit means to disconnect the ringing generator from the telephone line.

4. The ring-trip circuit of claim 3 wherein said control circuit includes a relay, a transistor and a rectifying circuit connected so that the output of said rectifying circuit renders said transistor conductive thereby energizing said relay whenever said output signal appears across the input of said rectifying circuit.

5. The ring-trip circuit of claim 4 wherein said control circuit includes a time delay circuit for delaying the response of said output signal.

6. A ring-trip circuit for detecting when a telephone handset is lifted from its cradle in response to a ringing signal applied to the telephone through the connected telephone line from a ringing generator connected in series with an office battery, comprising:

two saturable reactors;

an input winding for each reactor;

means for continuously energizing said input windings with an AC signal;

bias means for driving each of said two reactors into a saturated magnetic state;

a monitor winding for each reactor;

circuit means for connecting said monitor windings in series with one another between the telephone line and the ringing generator so that the ringing signal passes therethrough, the arrangement being such that a DC current through said monitor windings from the office battery upon the completion of a DC current path via the telephone when the handset is lifted produces a magnetic field in each reactor which drives said reactors out of saturation, and an output winding for each reactor connected in series with one another for providing an output AC signal across the series combination thereof whenever said saturable reactors are driven out of saturation, the arrangement being such that the voltages induced in each of said input windings from said respective input windings are additive and the voltages induced therein from said respective monitor windings are subtractive.

7. The ring-trip circuit of claim 6 including means connected across the series combination of said monitor windings for limiting the magnitude of AC ringing current therethrough.

8. The ring-trip circuit of claim 6 wherein said bias means comprises a bias winding for each reactor connected in series with one another to a DC power source.

9. The ring-trip circuit of claim 6 wherein said means for energizing said input windings includes the series connection of said input windings across which said AC signal is applied.

10. The ring-trip circuit of claim 6 including a control circuit connected across the series combination of said output windings responsive to said output signal for actuating said circuit means to disconnect the ringing generator from the telephone line.

11. The ring-trip circuit of claim 10 wherein said output circuit includes a relay, a transistor and a rectifying circuit connected so that the output of said rectifying circuit renders said transistor conductive thereby energizing said relay whenever said output signal appears across the input of said rectifying circuit.

12. The ring-trip circuit of claim 11 wherein said output circuit includes a time delay circuit for delaying the response to said output signal.

* * * * *

UNITED STATES PATENT AND TRADEMARK OFFICE

CERTIFICATE OF CORRECTION

PATENT NO. : 3,748,391

DATED : July 24, 1973

INVENTOR(S) : William E. Shaffer

It is certified that error appears in the above-identified patent and that said Letters Patent are hereby corrected as shown below:

Col. 3, line 48 "mullify" should read ---nullify---.

Col. 6, line 36 "input" should read ---output---

Signed and Sealed this sixth Day of January 1976

[SEAL]

Attest:

RUTH C. MASON
*Attesting Officer*

C. MARSHALL DANN
*Commissioner of Patents and Trademarks*